J. FARRINGTON.
Harvester Rake.
No. 101,246.
Patented March 29, 1870.
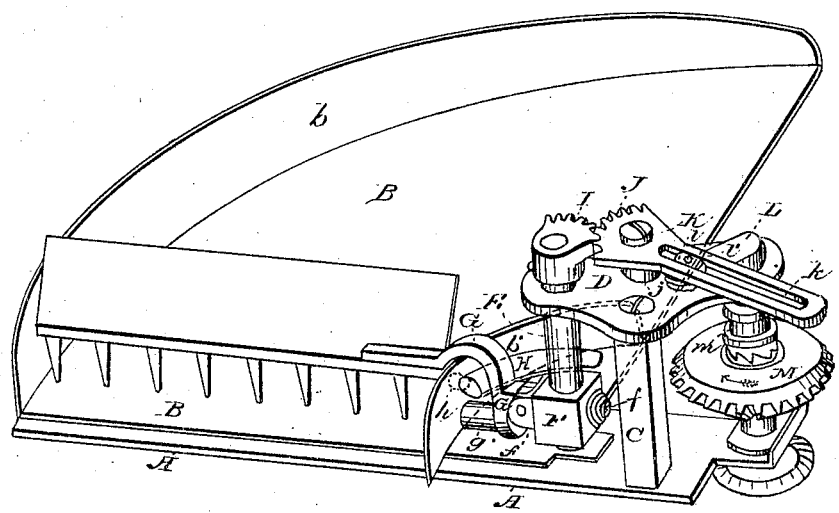
Witnesses
H H Doubleday
Alex Mahon
Inventor
Joel Farrington
by his atty A. M. Smith

United States Patent Office.

JOEL FARRINGTON, OF CORRY, PENNSYLVANIA, ASSIGNOR TO HIMSELF AND F. H. W. GREGG.

Letters Patent No. 101,246, dated March 29, 1870.

IMPROVEMENT IN HARVESTER-RAKES.

The Schedule referred to in these Letters Patent and making part of the same

*To all whom it may concern:*

Be it known that I, JOEL FARRINGTON, of Corry, county of Erie and State of Pennsylvania, have invented certain new and useful Improvements in Harvester-Rakes, of which the following is a full, clear, and exact description, reference being had to the annexed drawing which represents a perspective view of a harvester-rake attachment embracing my improvements.

My invention consists in a novel and simple arrangement of mechanism for imparting the necessary vibrating and rising and falling movements to a sweep-rake, and will be readily understood from the following description with reference to the drawing, in which—

A represents a finger or platform-bar, which may be of any usual form and construction and attached to the main frame either rigidly or by a hinge connection, in any usual manner.

B is the grain-platform, attached to bar A, and provided, at its outer and inner sides, with guards or fenders *b b'*, curved, or otherwise made to conform substantially to the path of the rake hereinafter described.

C is a standard, mounted on the inner end of bar A, and armed, at its upper end, with a gear-plate, D, the inner end or arm of which is perforated to form a bearing for a vertical rock-shaft or rake-pivot, E, the lower end of which is stepped upon or has a bearing in the finger-bar or platform at *e*.

F is an adjustable box mounted on shaft E, and made adjustable thereon either vertically or around said shaft as a center for varying the throw of the rake by means of a set-screw, *f*.

The box F is provided with lugs or ears at *f'*, in which is pivoted the bent rake-arm G, through a corresponding lug formed on said arm at *g*.

The lower horizontal arm or portion of rake-arm G is turned outward underneath the upper arched arm, and is provided with a friction-roller, *g'*, which, as the rake-arm is vibrated or swung backward, passes underneath a latch or inclined cam-way or track H, pivoted, at one end *h*, to the inner face of guard *b'*, or other suitable support.

Said latch or track has its forward end pivoted in an elevated position, and, as the roller *g'* passes underneath and escapes at its rear end, said rear end drops upon the platform, and upon the return of the rake to the forward edge of the platform the roller *g'* is forced to rise over the inclined upper face of said latch, raising the rake with it over the grain on the platform, until the roller escapes at the forward end of said latch or inclined plane and permits the rake to drop upon the platform in proper position to seize and remove the grain.

The upper branch G' of rake-arm G is arched to pass over the guard *b'*, and carries the rake-head attached to its outer end.

The vibratory movements of the rake are effected as follows:

The upper end of rock-shaft E has keyed to it a toothed segment, I, to which motion is imparted by means of a similar segment, J, formed on one end of a vibrating slotted plated or lever, K, mounted on a fixed stud or pivot, *j*, on gear-plate D.

*k* represents a slot formed in the long arm of lever K, in which works a slide, *l*, or a roller mounted on a wrist, *l'*, on crank-arm L.

Said arm L is attached to the upper end of an upright shaft mounted in bearings in the finger-bar A and gear-plate D, and to which motion is imparted by a bevel-wheel, M, driven by any suitable arrangement of gearing connecting it with the main drive-wheel or axle of the machine.

The bevel-wheel M is mounted loosely on its shaft, but is connected thereto by a "backing" clutch, *m*, which allows the shaft and rake to remain stationary when the machine is backed or when the clutch is disengaged by any suitable shipping device, placing it under the control of the driver.

The operation of the parts last above referred to is as follows:

Motion is imparted to the bevel-wheel M, and from said wheel through the feathered sliding clutch *m* to the vertical shaft and crank-arm L.

The wrist on the crank-arm moves back and forth in the slot *k* in the arm or lever K, vibrating the latter, and, through the segments J I, causing the rake to be vibrated back and forth horizontally through an arc of ninety degrees or thereabout, the necessary rising and falling movements being effected in a manner above explained.

By preference the crank-L and bevel-wheel M are rotated in the direction indicated by the arrow on the latter, as, in this case, the crank-wrist is nearest the pivotal center of lever K while imparting the discharging movement of the rake, and produces a more rapid movement of the lever and rake, thereby preventing accumulation of grain upon the rake, and the straggling or scattering consequent upon a slow motion of the latter.

By such arrangement, also, greater power is obtained to lift the rake over the incline H, which, from its proximity to the rake center E, is necessarily short and abrupt.

Having now described my invention,

What I claim as new, and desire to secure by Letters Patent, is—

1. The inclined pivoted rake-latch or track, arranged between the rake-pivot and the inner platform guard or fender, and attached to said fender, substantially as and for the purpose specified.

2. The curved (or angular) pivoted rake-arm G, roller g', and inclined rake-latch H, arranged relatively to the inner grain-guard or fender, as described.

3. The rake-arm, pivoted to a sliding adjustable box on the rake-shaft or pivot, as set forth.

4. The combination of shaft or pivot E, segments I J, slotted arm K, and crank L, with the vibrating sweep-rake for operating the same, as described.

5. The combination of crank L, slotted arm or lever K, segments I J, shaft or pivot E, pivoted rake-arm G, and inclined track H, arranged and operating substantially as described.

JOEL FARRINGTON.

Witnesses:
S. B. BROOKS,
J. A. McKENZIE.